United States Patent [19]

Cross

[11] Patent Number: 4,951,530
[45] Date of Patent: Aug. 28, 1990

[54] WIRE GUIDE FOR ROTARY WIRE STRIPPER

[75] Inventor: Dan A. Cross, Seattle, Wash.

[73] Assignee: The Boeing Company, Seattle, Wash.

[21] Appl. No.: 441,178

[22] Filed: Nov. 27, 1989

[51] Int. Cl.$^5$ .............................................. H02G 1/12
[52] U.S. Cl. ...................................... 81/9.51; 81/9.42
[58] Field of Search ...................... 81/9.51, 9.42, 9.43, 81/9.4

[56] References Cited

U.S. PATENT DOCUMENTS

| | | | |
|---|---|---|---|
| 2,645,959 | 7/1953 | Fuchs et al. | 81/9.51 |
| 2,671,363 | 3/1954 | Wells | 81/9.51 |
| 3,208,271 | 9/1965 | Thompson | 73/81 |
| 3,645,156 | 2/1972 | Meyer et al. | 83/9 |
| 3,881,374 | 5/1975 | Gudmestad | 81/9.51 |
| 4,185,522 | 1/1980 | Reinertz et al. | 81/9.51 |
| 4,327,609 | 5/1982 | Resch | 81/9.51 |
| 4,478,110 | 10/1984 | Undin et al. | 81/9.51 |
| 4,745,828 | 5/1988 | Stepan | 81/9.51 |

Primary Examiner—Roscoe V. Parker
Attorney, Agent, or Firm—Bruce A. Kaser

[57] ABSTRACT

A pair of wire guides or "centering jaws" for use in connection with the blades of a rotary wire stripper. Each wire guide has a gripping leg which, in cooperation with a similar wire guide on the other side of the wire to be stripped, tightly grips the end of the wire, but only on the portion of the wire's insulation which is actually stripped. This enables the stripped portion to function as a centering guide thereby keeping the wire's center conductor from coming into contact with the stripper's rotating blades during the stripping operation.

10 Claims, 5 Drawing Sheets

U.S. Patent   Aug. 28, 1990   Sheet 1 of 5   4,951,530
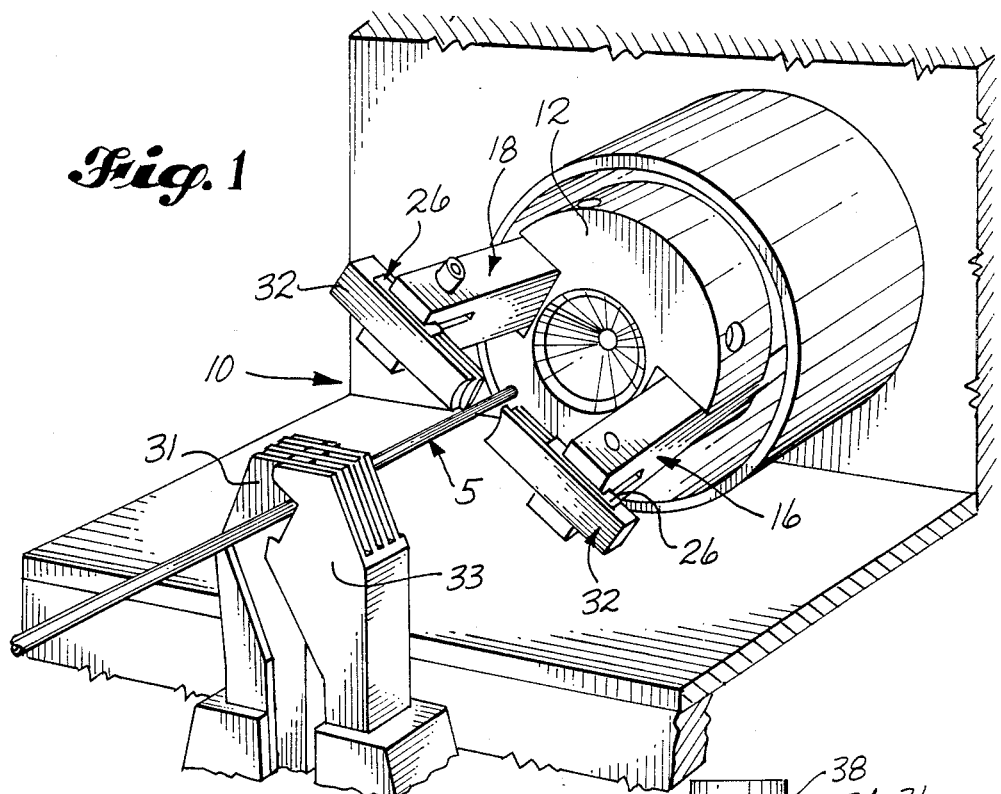
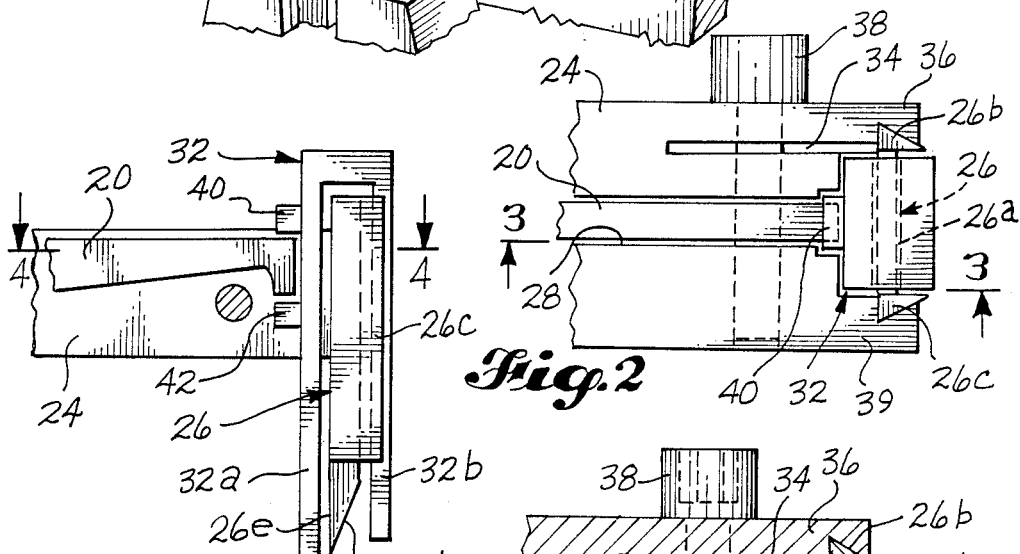
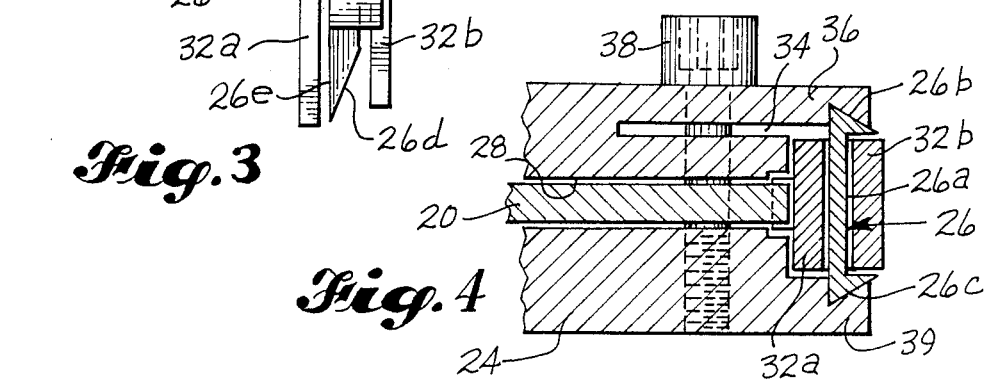

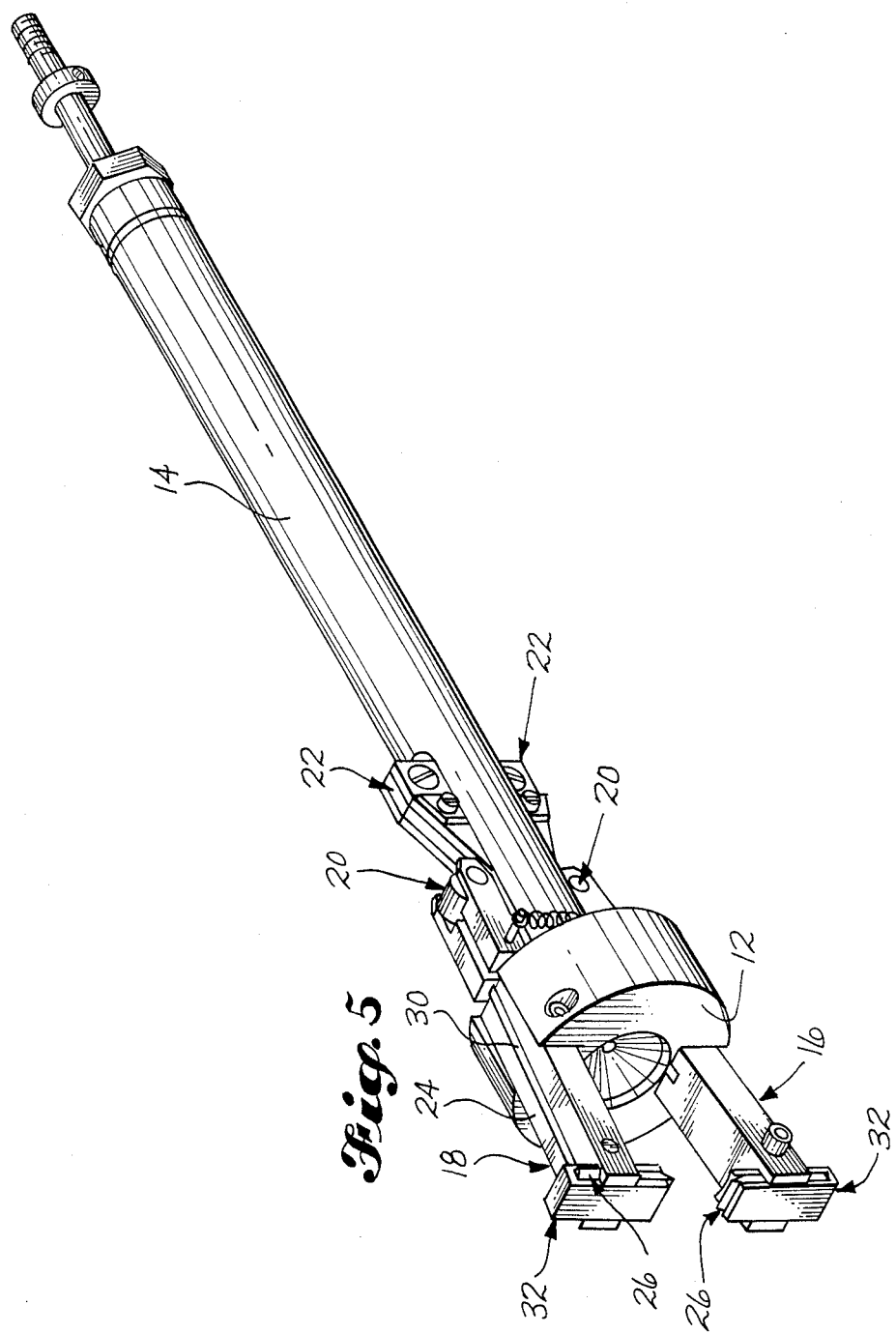

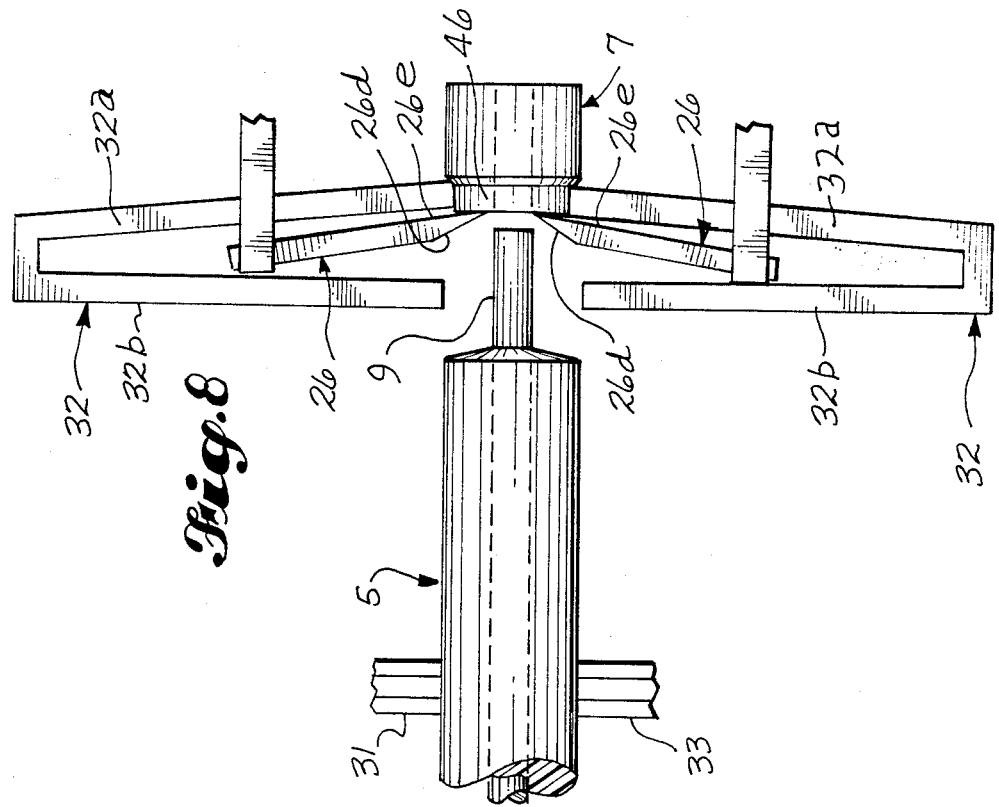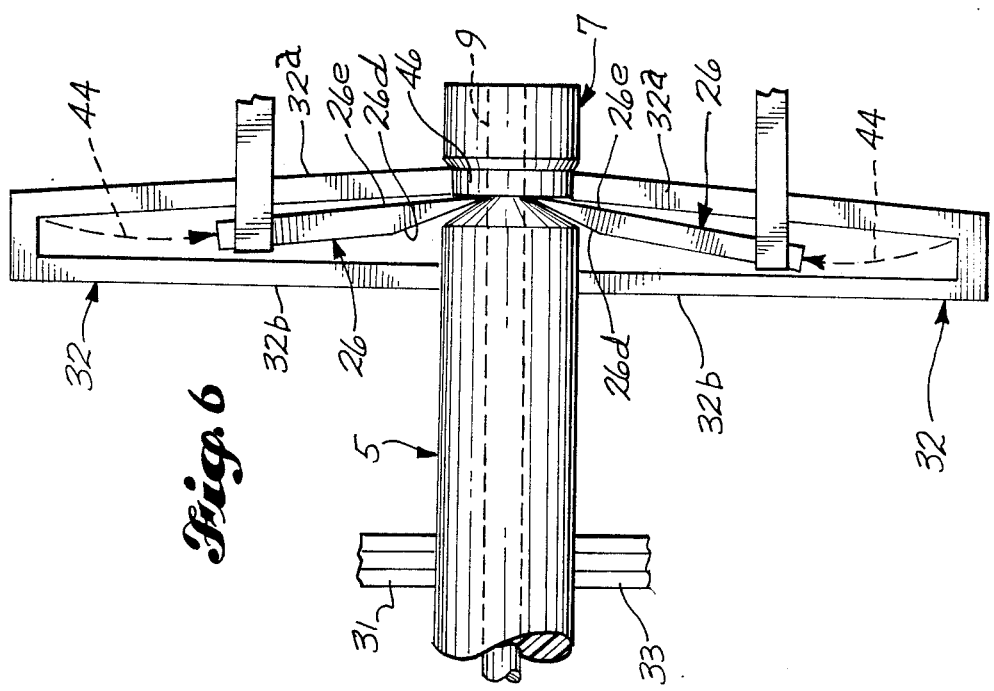

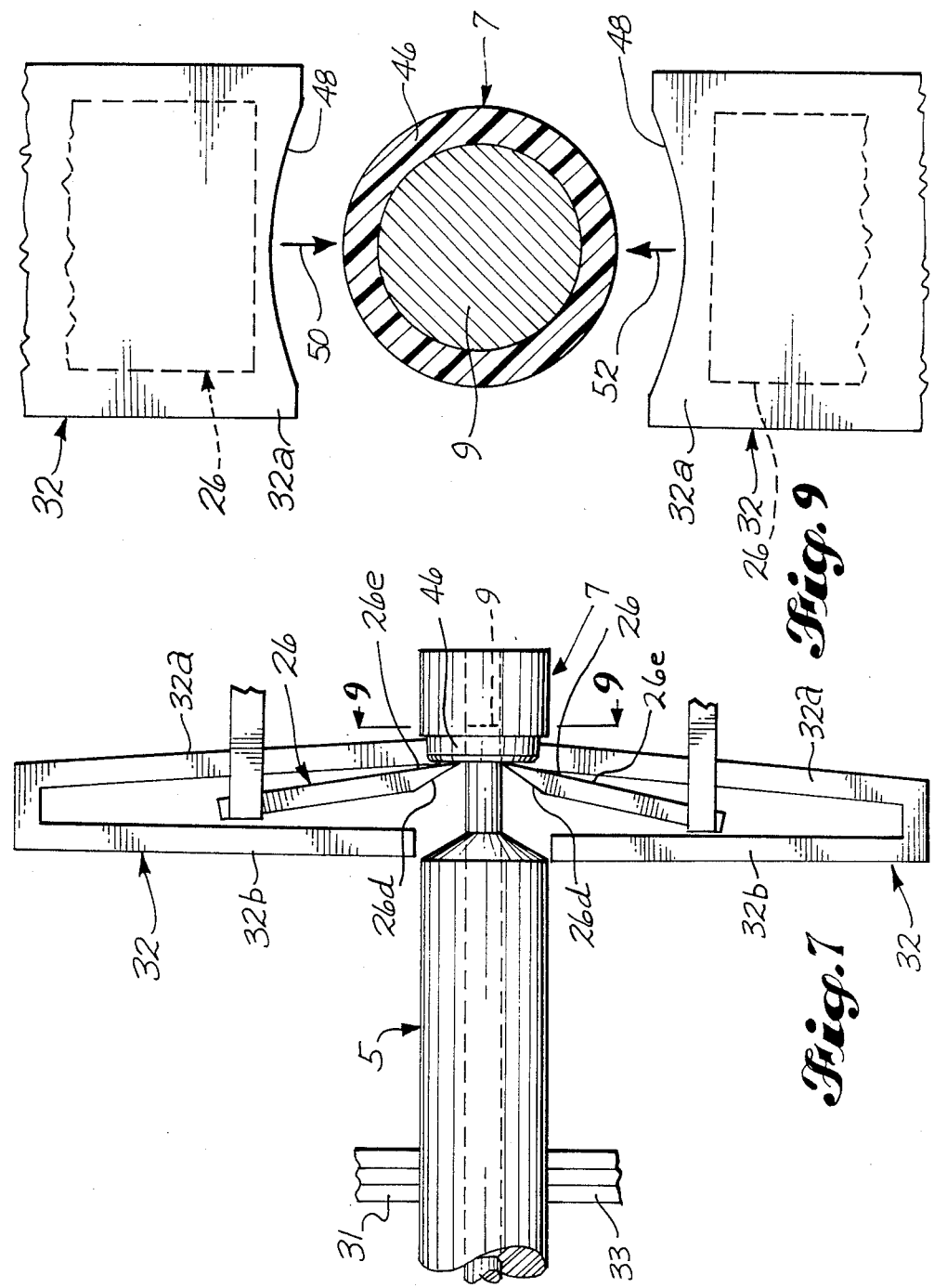

WIRE GUIDE FOR ROTARY WIRE STRIPPER

TECHNICAL FIELD

This invention relates to automated wire strippers. More particularly, it relates to wire guides that are used in connection with rotary wire strippers, for centering and gripping a wire with respect to the stripper's blades as the insulation is stripped from the wire's end.

RELATED APPLICATIONS

The invention is related to co-pending application Serial No. 07/446,181, which is entitled, "Notched Blade for Rotary Wire Stripper."

BACKGROUND ART

The type of wire guide disclosed here is designed to be used in connection with a rotary wire stripper of the kind disclosed in U.S. Pat. No. 4,745,828 (the '828 stripper), although it is also applicable to other rotary stripper configurations. The '828 stripper has a pair of diametrically opposed blades driven in rotation so that their cutting edges circle about the end of a wire that is to be stripped. As the blades circle, they are simultaneously moved in a symmetrical fashion radially inwardly until their cutting edges contact and out the wire's insulation to a predetermined depth. The cut insulation at the end of the wire, which is commonly called a "slug", is then stripped from the wire by pulling it axially outwardly.

FIGS. 10 and 11, both of which are labeled "prior art", provide an exaggerated view of certain "U" shaped wire guides that, prior to the present invention, have commonly been used in conjunction with the '828 stripper for centering the wire to be stripped relative to the stripper's blades. Referring first to Fig. 10, the '828 patent calls its "U" shaped wire guides "centering jaws" which are indicated at 1, 3. As just mentioned, these function to center a wire 5 as the slug 7 covering the center conductor 9 at its end is stripped.

The centering jaws 1, 3 and stripper blades 11, 13 both rotate about the wire 5 is the blades are moved inward to cut the insulation. As is clearly evident from the description in the '828 patent, the blades 11, 13 slidingly move within the "U" of the centering jaws 1, 3 at least partially independently of the radial inward movement of the jaws. In other words, both the jaws 1, 3 and blades 11, 13 generally move simultaneously inwardly toward the wire 5 until the jaws 1, 3 first contact the outer surface of the wire's insulation. This is indicated at 15 and 17 in Fig. 10.

Further radial inward movement by the jaws 1, 3 is, at that point, prevented by the wire's insulation as it resists the force provided by a central spring that moves the jaws (see reference numeral !8 in Fig. 1 of the '828 patent). However, the blades 11, 13 are separately driven inward, as is schematically indicated by dashed lines 19 and 21, and continue to cut inwardly, sliding, along jaws 1, 3, until they substantially cut through the insulation. Thereafter, both the jaws 1, 3 and blades 11, 13 are pulled axially away from the wire's end in the manner schematically indicated at 23 and 25 in FIG. 11.

The stripper's blades 11, 13 continue to rotate and remain near the wire's center conductor 9 as they are pulled away. Their beveled edges 27, 29 are what engage with and actually pull the slug 7 off the wire's end. The wire itself is constrained from moving by nonrotating clamping jaws 31, 33 which hold the wire 5 inwardly of slug 7. For further reference, these clamping jaws 31, 33, which are different from centering jaws 1, 3, are indicated by reference numeral 11 in the '828 patent.

As soon as the centering jaws 1, 3 clear the wire's insulation beyond the blade-cut position, which is shown at 35, 37 in FIG. 11, there is nothing to otherwise center the wire's end relative to the blades. What this means is that the slug is essentially free to jiggle back and forth in the directions indicated by arrow 39. This will bring center conductor 9 into contact with the rotating blades !1, 13 and create nicks.

Generally, the '828 stripper is intended for use on a special subcategory wire type (co-axial wire) which typically is constructed of very soft, thick insulation. This allows stoppage of blade closure significantly before encounter of the conductor, thus avoiding nicking the conductor. The '828 stripper was not designed to strip thin insulation and cannot do so without nicking the conductor.

Minor nicking is not a problem in many or most manufacturing environments. However, airplane, government and military requirements dictate that no nicks can be present in wires used on many aircraft. Therefore, although the '828 stripper is excellent for use in stripping wires where nicking does not impose a constraint on manufacturing, it has not, prior to the implementation of the present invention and the related copending applications cited above, been useful for stripping wires having hard, thin insulation which is typical for aircraft use. This problem has led to the development of the wire guide structure disclosed here.

A significant difference between the '828 centering jaws 1, 3 shown in FIGS. 10 and 11, and a pair of wire guides constructed in accordance with the present invention, is that the jaws 1, 3 grip the wire 5 on those sides 11a, 13a of the stripper's blades which are opposite from the sides 11b, 13b facing the slug 7. That is to say, the guides of the present invention grip the slug itself. This difference, and its advantages, will become apparent upon consideration of the following description.

SUMMARY OF THE INVENTION

The invention is a wire guide that is mounted adjacent each of the rotating blades of a rotary wire stripper. If the wire stripper is of a type disclosed in U.S. Pat. No. 4,745,828, it will have two rotating blades, meaning it will employ a pair of wire guides in accordance with the invention, one next to each blade. Each wire guide is at least slightly movable toward and away from the wire independently of the blade's radial cutting movement, and each wire guide has a gripping leg that extends generally toward the wire.

As the blades come together, for the purpose of cutting the wire's insulation, the ends of the guide's gripping legs first cooperatively center and grip the end of the wire, but on the slug-side of the blades. This causes the slug to act as a centering guide while it is stripped from the wire, thus keeping the center conductor away from the blades as they move axially outwardly pulling the slug off the wire.

Generally, each wire guide moves toward the wire substantially simultaneously with its respective blade, although the blade's cutting edge remains retracted relative to the end of the guide's gripping leg until the leg makes contact with the insulation slug. The end of the leg has a concave shape for urging the wire into a centered position relative to the blades. After the leg's end contacts the insulation, the blade continues to move radially inwardly and cut through the insulation.

The stripper's blades travel along a slight arc that is generally in the same plane as the wire's axis as they move radially toward the wire. The gripping leg of each wire guide is preferably angled slightly toward the end of the insulation's slug so as to not interfere with the arc of blade travel.

Each wire guide also has a centering leg that is laterally spaced from the guide's gripping leg, but extends generally toward the wire on the other side of the blade. The centering leg is shorter than the gripping leg so that, depending on the wire's outer diameter, it has a centering action on the wire, but in a sliding, nongripping fashion.

Each blade has a beveled edge. In the '828 stripper, the bevel always faces the slug. In the present invention, the bevel is reversed and faces away from the slug so that the blade operates more efficiently in pulling the slug off the wire. This is especially beneficial for gripping the very thin insulation typical of aircraft usage.

The advantage to using a wire guide or guides in accordance with the invention is that it permits very close approach of cutting blades to the wire conductor and stripping of the wire's end without nicking the conductor. The way the invention works will become more fully understood upon reading the following best mode for carrying out the invention.

BRIEF DESCRIPTION OF THE DRAWINGS

In the drawings, like reference numerals and letters refer to like parts throughout the various views, except where otherwise indicated, and wherein:

FIG. 1 is a fragmentary pictorial view of the forward portion of a rotary wire stripper of the kind disclosed in U.S. Pat. No. 4,745,828, and shows the position of two wire guide and blade assemblies in accordance with the invention relative to the end of a wire which is about to be stripped;

FIG. 2 is a top plan view of one of the wire guide and blade assemblies shown in Fig. 1;

FIG. 3 is a side view of one of the wire guide and blade assemblies shown in FIG. 1, and is taken along line 3—3 in FIG. 2;

FIG. 4 is a sectional view of the wire guide and blade assembly shown in FIGS. 2 and 3, and is taken along line 4—4 in FIG. 3;

FIG. 5 is a pictorial view of a drive shaft assembly for a rotary wire stripper of the kind disclosed in U.S. Pat. No. 4,745,828 and, similar to Fig. 1, shows the relative position of two wire guide and blade assemblies in accordance with the invention;

FIG. 6 is an exaggerated side view of the wire guide and blade assemblies shown in FIGS. 1 and 5, and shows the slug end of a wire that is about to be stripped centered between the gripping legs of the wire guides;

FIG. 7 is a view like FIG. 6, but shows the wire's insulation slug being pulled axially away from the end of the wire;

FIG. 8 is a view similar to FIGS. 6 and 7, but shows the slug completely removed from the center conductor making up the wire's end;

FIG. 9 is a schematic, fragmentary side view of the wire guide and blade assemblies and shows them spaced from the wire prior to a cutting action;

BEST MODE FOR CARRYING OUT THE INVENTION

Figure 11:
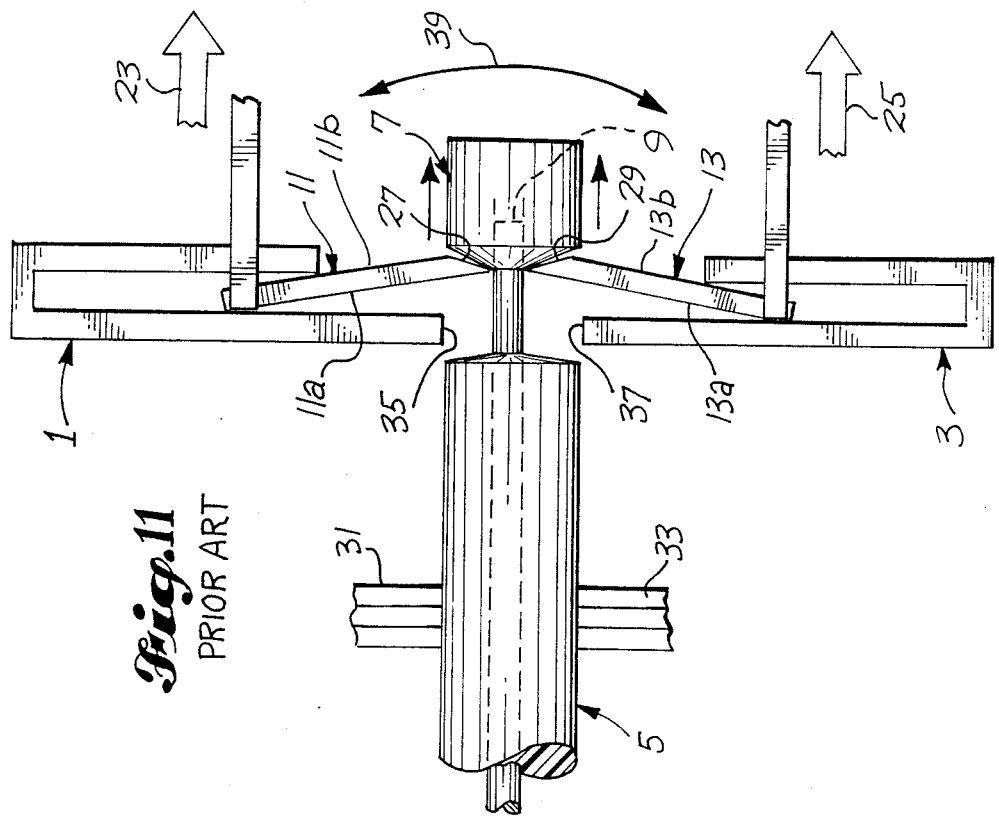
FIG. 11 is a view like FIG. 9, and is also labeled "prior art", and shows an insulation slug being axially stripped from the end of a wire.

Referring now to the drawings, and first to FIG. 1, therein is shown at 10 the "jaws" of a rotary wire stripper of the kind disclosed in U.S. Pat. No. 4,745,828. Briefly, the stripper has a head 12 which is driven in rotation by a shaft 14 (see FIG. 5). Pivotably mounted to the head 12 are a pair of arm assemblies 16, 18 which rotate about the end of the wire 5 as shaft 14 rotates, and which are simultaneously pivoted by roller and ramp assemblies 20, 22.

Each arm assembly 16, 18 has a blade arm portion 24 which holds a cutting blade 26 in a manner that will be further described later. Such portion 24 has a central slot 28 (see FIGS. 2 and 4) in which is received a guide arm portion 30 that holds a wire guide 32, in a manner that will also be further described later.

Referring now to FIGS. 2-4, and first to FIG. 3, shown at 32 is a wire guide constructed in accordance with the invention. Wire guide 32 is mounted adjacent blade 26. The shape of blade 26 as shown in the drawings is conventional, and would be known to a person having familiarity with the rotary wire stripper disclosed in the '828 patent. Briefly, the blade 26 has a channel surface 26a (see FIG. 4) defined by lateral guide rails 26b, 26c on opposite sides of surface 26a.

Movement of blade 26 is at least partially independent of the movement of wire guide 32. That is to say, blade movement is driven only by blade arm portion 24. The blade 26 is fixedly connected to this portion 24 in a manner that is shown in FIGS. 2 and 4. Specifically, arm portion 24 has a slot 34 which permits a slight amount of flexing by a section 36 of blade arm portion 24 that is laterally outward of the slot 34. Tightening a screw 38 causes this section 36 to flex laterally inwardly, thus tightly clamping blade rails 26b, 26c between section 36 and section 39 of the blade arm portion 24 which is on the other lateral side (see FIGS. 2 and 4).

As mentioned previously, the blade 26 is slidingly received in wire guide 32, the latter being independently driven upwardly and downwardly only by the guide arm portion 30 of each arm assembly 16, 18. Guide arm portion 30 drives wire guide movement by pushing against abutments 40, 42 (see FIG. 3). As mentioned previously, the blade 26 is separately driven by the blade arm portion 24 of each arm assembly 16, 18.

The skilled person would know that as arm assemblies 16, 18 of the stripper 10 rotate about the wire 5, and simultaneously move wire guide and blade assemblies 32, 26 toward the end of the wire from opposite sides, the blade 26 is first retracted relative to the wire guide's gripping leg 32a, in the manner shown in FIG. 3. If a more detailed explanation is needed as to how arm assemblies 16, 18 function to independently move the wire guide and blade assemblies 32', 26' reference is made to the '828 patent.

Referring now to FIG. 6, there is shown an exaggerated schematic view of the blade and guide assemblies 32, 26 shown in FIGS. 2-4. It should be understood that the orientation of the guide and blade assemblies 32, 26 shown in FIGS. 6-8 is reversed from the orientation shown in FIGS. 2-4. The gripping leg 32a of each wire guide, which is on the slug side of the blade 26, is longer than the wire guide's centering leg 32b on the other side. Therefore, as wire guide and blade assemblies 32, 26 come together on opposite sides of the wire 5, the gripping legs 32a extend generally toward the wire and tightly grip the slug 7. Referring back to FIG. 5, drive shaft 14 has an internal spring (not shown in the drawings) which, acting through ramp assemblies 22, governs the gripping force of the wire guides' gripping legs 32a. In the past, its spring constant had to be kept low, so that the guides would not grip the wire 5 too tightly and could slide freely over the insulation when the cut slug is pulled from the wire's end. The wire guides 32 of the present case, however, may utilize a higher spring constant and thus grip the wire much tighter In cases where wires having soft insulation are stripped, this may create annular grooves 46 in the slug 7 next to the blades 26 (see FIGS. 6-8). This is beneficial as most such wires are not perfectly round and such grooving tends to bring the wire into round at least near the cut which, in turn, causes the rotating blades to be co-centered to the central conductor of the wire. The ends 48 of each guide's gripping leg are preferably curved into a concave shape to further promote rounding and centering of the wire prior to cutting. This is best seen in FIG. 9, which schematically indicates via arrows 50, 52 radial inward movement of guide and blade assemblies 32, 26 toward the wire's slug 7.

After the ends 48 of the wire guides 32 contact the wire 5, blades 26 continue to move radially inwardly cutting through the wire's insulation in the manner shown in FIG. 6. As a person skilled in the art would know, blades 26 may travel along a slight arc, indicated by dashed lines 44 in FIG. 6 as they move radially inwardly. In order that gripping leg 32a does not interfere with this travel, it may be desirable to angle at least a portion of the leg outwardly toward the end of slug 7. Although this is shown in the embodiment of FIGS. 6-8, it is not shown in the embodiment of FIGS. 2-4 as it may not be necessary in all cases.

Figure 10:
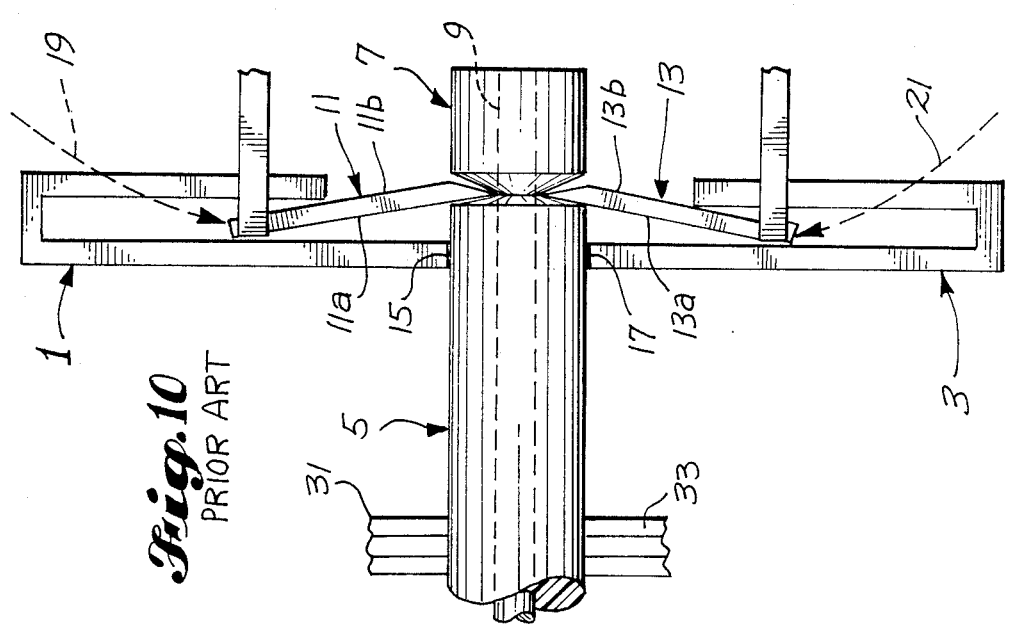
Fig. 10 is a view similar to FIGS. 7-8, but illustrates the type of wire guide presently employed in the '828 patent, and is labeled "prior art"

After the wire's insulation is cut, wire guide and blade assemblies 32, 26 are pulled axially outwardly in the same manner as the prior art configurations shown in FIGS. 10 and 11 described previously. The significant difference is that, slug 7 serves as a guide and holds the wire's center conductor 9 centralized relative to the blades during this movement (see FIG. 7). Having the guide's gripping legs 32a grip the slug 7 instead of the other side of the wire therefore eliminates the previously-mentioned jiggling effect. In fact, center conductor 9 is effectively prevented from moving back and forth until the slug 7 is pulled free from its end. At that point, the blades 26 will be clear of the conductor in the manner illustrated in FIG. 8.

The bevel 26d of the blades is reversed from the prior art configuration shown at 27 in FIGS. 9 and 10. This permits the blade's flat side 26e to pull slug 7 off the wire and is especially more efficient for thin insulation than using the bevel. Lastly, the centering leg 32b of each wire guide 32 is shorter than the gripping leg 32a. It should be sufficiently short so that it does not have any gripping action, but is preferably dimensioned so that it will aid in centering the wire as wire guide and blade assemblies 32, 26 strip the slug 7.

Having thus described what is believed to be the best mode for carrying out the invention, it is to be understood that certain changes could be made to the wire guide and blade assemblies 32, 26 described above without departing from the spirit and scope of the invention. For example, it is anticipated that the wire guide 32 disclosed here will be used to modify the comparable guides currently being used on the '828 stripper. The '828 stripper employs one pair of blades and thus requires two wire guides. It is conceivable that it will be modified in the future to use four blades (two pairs), thus requiring four wire guides, one pair of guides for each pair of blades. In such case, each pair of guides would operate similarly to the single pair described above.

It is not intended that any of the preceding description be taken in the limiting sense. Instead, the spirit and scope of the invention is to be limited only by the subjoined patent claim or claims, Wherein such claims are to be interpreted in accordance with the established doctrines of patent claim interpretation.

What is claimed is:

1. For use in a rotary wire stripper characterized in that, when in operation, the stripper has at least one pair of diametrically opposed blades driven in a manner so that their cutting edges circle about the end portion of a wire to be stripped, and simultaneously move in a symmetrical, radially inward fashion until their cutting edges contact and out the insulation surrounding the wire's center conductor, to permit stripping the insulation slug from the wire's end portion, an improved wire guide apparatus for centering and holding the wire's end portion during such operation, comprising:
   a wire guide mounted adjacent each blade of said at least one pair of blades, said wire guides being driven by said rotary wire stripper in a manner so that said wire guides generally move along with their respective blades, but each wire guide being at least slightly movable toward and away from the wire independently of each blade's radial cutting movement, each wire guide having a gripping leg extending generally toward the wire on the blade's slug side, the end of said leg coming into contact with the insulation slug at least as early as the time the blade's cutting edge contacts the wire's insulation, with the end of said gripping leg of one wire guide cooperating with the end of the gripping leg of the other, to center and grip the outer surface of the slug as it is cut and stripped from the wire's end portion.

2. The apparatus of claim !, wherein each wire guide further includes a centering leg that is laterally spaced from said gripping leg and extends generally toward the wire on the other side of the blade, said centering leg being shorter than said gripping leg, in a manner so that the ends of the centering legs cooperate to slidingly center the wire with respect to the stripper's blades in a non-gripping manner.

3. The apparatus of claim 1, wherein the blades of the stripper each travel along a slight arc relative to each blade's respective wire guide as the blades cut the wire's insulation, and wherein
   said gripping leg is sufficiently spaced from said blade so as to not interfere with said blade arcuate travel.

4. The apparatus of claim 3, wherein said gripping leg is angled toward the end of the insulation slug so as to not interfere with said blade arcuate travel.

5. The apparatus of claim 3, wherein said gripping leg is offset toward the end of the insulation in a manner so as to not interfere with said blade arcuate travel.

6. The apparatus of claim wherein the end of each gripping leg has a curved portion shaped in a manner so as to urge the slug into a centered position.

7. The apparatus of claim 2, wherein the end of each centering leg has a curved portion shaped in a manner so as to urge said wire into a centered position.

8. The apparatus of claim 6, wherein the end of each gripping leg has a concave shape.

9. The apparatus of claim 7, wherein the end of each centering leg has a concave shape.

10. The apparatus of claim !, wherein each blade has a beveled edge facing away from the blade's slug side.

* * * * *

UNITED STATES PATENT AND TRADEMARK OFFICE
CERTIFICATE OF CORRECTION

PATENT NO. : 4,951,530

DATED : August 28, 1990

INVENTOR(S) : Dan A. Cross

It is certified that error appears in the above-identified patent and that said Letters Patent is hereby corrected as shown below:

In the Abstract, first line, the sentence should begin "The invention is a".

Col. 1, line 26, "out" should be -- cut --.

Col. 1, line 42, "wire 5 is" should be -- wire 5 as --.

Col. 1, line 55, "!8" should be -- 18 --.

Col. 1, line 58, delete the comma after "sliding".

Col. 2, line 12, "!1" should be -- 11 --.

UNITED STATES PATENT AND TRADEMARK OFFICE
CERTIFICATE OF CORRECTION

PATENT NO. : 4,951,530
DATED : August 28, 1990
INVENTOR(S) : Dan A. Cross

It is certified that error appears in the above-identified patent and that said Letters Patent is hereby corrected as shown below:

Col. 4, lines 13 and 15, "!2" should be -- 12 --.

Col. 4, line 49, "!6, !8" should be -- 16, 18 --.

Col. 4, lnie 55, "!0" should be -- 10 --.

Col. 4, line 62, "32', 26'" should be -- 32, 26 --.

Col. 5, line 16, there should be a period after "tighter".

Col. 6, line 16, "Wherein" should be -- wherein --.

Claim 1, col. 6, line 26 (or 27), "out" should be -- cut --.

Claim 6, col. 7, line 1, after "claim", insert -- 1, --.

Claim 10, col. 8, line 5, "claim !" should be -- claim 1 --.

Signed and Sealed this

Twenty-fifth Day of February, 1992

Attest:

HARRY F. MANBECK, JR.

*Attesting Officer*     *Commissioner of Patents and Trademarks*